United States Patent [19]
Breedwell

[11] Patent Number: 6,125,790
[45] Date of Patent: Oct. 3, 2000

[54] PET LOVER'S CHOICE

[76] Inventor: Raymond Breedwell, 621 E. Orange St., Apopka, Fla. 32703

[21] Appl. No.: 09/273,189

[22] Filed: Mar. 19, 1999

[51] Int. Cl.⁷ .................................................... A01K 7/00
[52] U.S. Cl. ........................ 119/51.5; 119/61; 119/72
[58] Field of Search ................... 119/51.5, 61, 72

[56] References Cited

U.S. PATENT DOCUMENTS

| | | | |
|---|---|---|---|
| D. 273,430 | 4/1984 | Salinas | D30/16 |
| D. 326,742 | 6/1992 | Tart | D30/130 |
| D. 338,288 | 8/1993 | Key | D30/129 |
| D. 342,353 | 12/1993 | Anastasi | D30/130 |
| 395,490 | 1/1889 | French | 119/51.5 |
| 1,552,076 | 9/1925 | Mosier | 119/61 |
| 1,994,859 | 3/1935 | Langum | 43/131 |
| 2,191,811 | 2/1940 | Trampier | 119/51 |
| 2,542,400 | 2/1951 | Donofrio | 65/15 |
| 2,554,086 | 5/1951 | Block | 119/61 |
| 2,973,932 | 3/1961 | Van Huis et al. | 248/125 |
| 3,441,003 | 4/1969 | Du Mond et al. | 119/61 |
| 3,651,787 | 3/1972 | Cooper | 119/51 |
| 4,007,711 | 2/1977 | Michael | 119/51.5 |
| 4,030,451 | 6/1977 | Miller | 119/57.9 |
| 4,361,116 | 11/1982 | Kilham | 119/51.01 |
| 4,573,434 | 3/1986 | Gardner | 119/77 |
| 4,784,086 | 11/1988 | Hand et al. | 119/61 |
| 4,896,627 | 1/1990 | Riddell | 119/51.5 |
| 4,953,506 | 9/1990 | Sanders | 119/61 |
| 5,031,575 | 7/1991 | Phillips | 119/61 |
| 5,069,167 | 12/1991 | Kasselman | 119/61 |
| 5,113,798 | 5/1992 | Rera | 119/61 |
| 5,125,363 | 6/1992 | McGaha | 119/51.5 |
| 5,165,365 | 11/1992 | Thompson | 119/61 |
| 5,205,242 | 4/1993 | Kasselman | 119/61 |
| 5,209,184 | 5/1993 | Sharkan et al. | 119/61 |
| 5,245,948 | 9/1993 | McClellan | 119/51.5 |
| 5,253,609 | 10/1993 | Partelow et al. | 119/61 |
| 5,259,336 | 11/1993 | Clark | 119/51.5 |
| 5,277,149 | 1/1994 | East | 119/51.5 |
| 5,285,749 | 2/1994 | Byer | 119/61 |
| 5,488,927 | 2/1996 | Lorenzana et al. | 119/51.5 |
| 5,619,952 | 4/1997 | Walker | 119/61 |

*Primary Examiner*—Michael J. Carone
*Assistant Examiner*—Son T. Nguyen
*Attorney, Agent, or Firm*—Brian S. Steinberger; Law Offices of Brian S. Steinberger

[57] ABSTRACT

A three piece pet food/water dish that gives the appearance of a single pet dish having a bottom ground engaging diameter having a greater diameter than the exterior of the top edge. The dish invention includes a bottom, center and top bowls. The bottom bowl has inwardly sloping sides and an interior cavity has an upwardly projecting solid triangular cross-sectional shaped stem. The center bowl has round sides with a diameter less than the interior cavity diameter of the bottom bowl has a downwardly projecting hollow triangular cross-sectional shaped stem which mateably interlocks about the upwardly projecting solid stem in the bottom bowl. The center bowl also has an upwardly projecting hollow triangular cross-sectional stem in the interior cavity. The top bowl has inwardly sloping sides has a downwardly projecting solid triangular cross-sectional shaped stem which mateably fits into and interlocks with the upwardly hollow stem in the center bowl. The top bowl being used for pet food and drinking water. Both the bottom and center bowls an be filled with creature inhibiting liquids and/or dry materials such as detergent, anti-worm substances, insect inhibiting materials, combinations thereof and different materials in each dish. The creature inhibiting liquids and materials can be toxic to insects such as fire ants and non toxic to household pets.

11 Claims, 2 Drawing Sheets

PET LOVER'S CHOICE

This invention relates to pet food/water dishes, and in particular to a three interlockable pieces having a small, conical sided top bowl containing pet food/drinking water with a stem projecting underneath, a large conical sided bottom bowl with a hollow central receptacle, and a very small rounded side middle bowl that and mateably interlocks to the stem and the receptacle between the top and bottom bowls, where the bottom and middle bowls contain insect inhibiting substances such as detergent that is non toxic to household pets.

BACKGROUND AND PRIOR ART

It is a well known problem that bugs and insects tend to crawl into pet food and water dishes, eating and contaminating the food. This can cause wasted food and water and contamination that can lead to pet sickness. For example, in warm climates such as Florida, fire ants are both a nuisance and difficult problems for pets since fire ants cause painful bites.

Many types of pet food and water dishes have been proposed. See for example, U.S. Pat. Nos. 2,191,811 to Trampier; 2,542,400 to Donofrio; 2,973,932 to Huis, et al.; 3,651,787 to Cooper; 4,573,434 to Gardner; 4,784,086 to Hand et al.; 5,209,184 to Sharkan et al.; ; 5,259,336 to Clark; 5,285,749 to Byer; and 5,488,927 to Lorenzana. However, none of these patents contain water obstacles to prevent the insects from crawling into the main area containing the food and water.

Other types of pet food dishes have been proposed that contain water moats to prevent insects from crawling into food. See for example, U.S. Pat. Nos. Des. 326,742 to Tart; Des. 342,353 to Anastasi; 395,490 to French; 2,191,811 to Trampier, Sr.; 2,554,086 to Block; 4,007,711 to Michael; 5,031,575 to Phillips; 5,113,798 to Rera; 5,165,365 to Thompson; 5,205,242 to Kasselman; 5,245,948 to McClellan; and 5,277,149 to East. However, these patents are generally restricted to a single thin strip of water surrounding a center water/food dish close to ground level. Insects can still swim and/or jump a short distance over the single thin water strip into the center water/food dish. Kasselman '948 has a food/water dish above the moat. However, the sides of the top food/water dish are close to the moat dish sides, which would allow larger insects to be able to travel the short separate distance.

U.S. Pat. Nos. 1,994,859 to Langum; 4,896,627 to Riddell; and 5,253,609 to Partelow et al. each describe double ring type moat devices. However, Langum '859 is used as a "Fly Poisoning Device", title, and uses a poisonous liquid to circulate downward from an internal container 18 to a moat 16, and is not capable of being used to provide water and food for pets. Riddell '627 describes an "ant proof pet dish", title, and uses dual moats. However, Riddell '627, uses the middle moat 14 as a water dish that is always open from above(FIG. 3) to additional insects and other contamination that can access it. Riddell '627 requires substantially different structural and nonsymmetrically arranged bottom, middle and top dishes(FIGS. 3–4) that would be difficult to transport, unsightly to display(does not appear as a pet food/water dishes) and requires excessive amounts of use space due to its' height and large bottom dish size. Partelow '609 describes a "pet dish", title, having an inner and outer moats 30, 20 FIG. 1. However, Partelow '609 requires through-holes 42, 50 that allow the same moat water to flow between the moats 20, 30 thus allowing water swimming insects to be able to traverse the moats as if only a single moat existed. Furthermore, the main support poles and sockets 21, 26, 52, 62, 66 FIG. 1, are circular pipe shaped and are rotatable, column 4, lines 4–7. The combination of the movable pipe shaped pedestals, and the rounded top shape 64 of the bottom pedestal makes the overall device in Partelow '609 shaky and not particularly sturdy. The rotatable sockets can easily be turned by the pet allowing the pet to access the inner moats containing insect contaminated water. Furthermore, the exterior shape of the Partelow '609 device does not resemble a normal pet food/water dish. Still furthermore, Langum '859, Riddell '627 and Partelow '609 would have assembled heights of up to one foot or more, and not fit into typical storage spaces under chairs, tables, cabinets and the like.

SUMMARY OF THE INVENTION

The primary objective of the present invention is to provide a three piece molded plastic pet feeding bowl, which allows food and/or drinking water to be untainted by crawling insects.

The second object of this invention is to provide a three piece feeding bowl with dual separate moats that when assembled resembles a normal feeding bowl with a height of less than approximately eight and ½ inches.

A preferred embodiment of the three piece invention includes a bottom bowl having a ground engaging bottom, inwardly sloping sides, and a top portion having an opening for an interior cavity with a top exterior diameter less than the bottom exterior diameter, the bottom bowl has a first non-cylindrical shaped stem extending upward from a central portion of the interior cavity. A center bowl has a bottom with a second non-cylindrical stem extending downward beneath the bottom, the center bowl having a top portion with an interior cavity. The center bowl has an exterior diameter less than the diameter of the interior cavity of the bottom bowl, and a third non-cylindrical shaped stem extending upward from a center portion of the interior cavity. A top bowl has a bottom with an exterior diameter approximately identical to the top exterior diameter of the bottom bowl. The bottom of the top bowl has a fourth non-cylindrical shaped stem extending downward from a central portion of the flat bottom. The first non-cylindrical stem and the second non-cylindrical stem telescopingly and mateably interlock with one another, and the third non-cylindrical stem and the fourth non-cylindrical stem telescopingly and mateably interlock with one another. The non-cylindrical stems can have triangular cross-sectional shapes. The bottom, center and top bowls are not able to rotate when assembled together. The bottom bowl and the top bowl appear together as one single food dish with the center bowl hidden from view. Both the bottom and middle bowls can be filled with substances such as detergent, and the like, which can be harmful to insects such as fire ants but non toxic to household pets.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
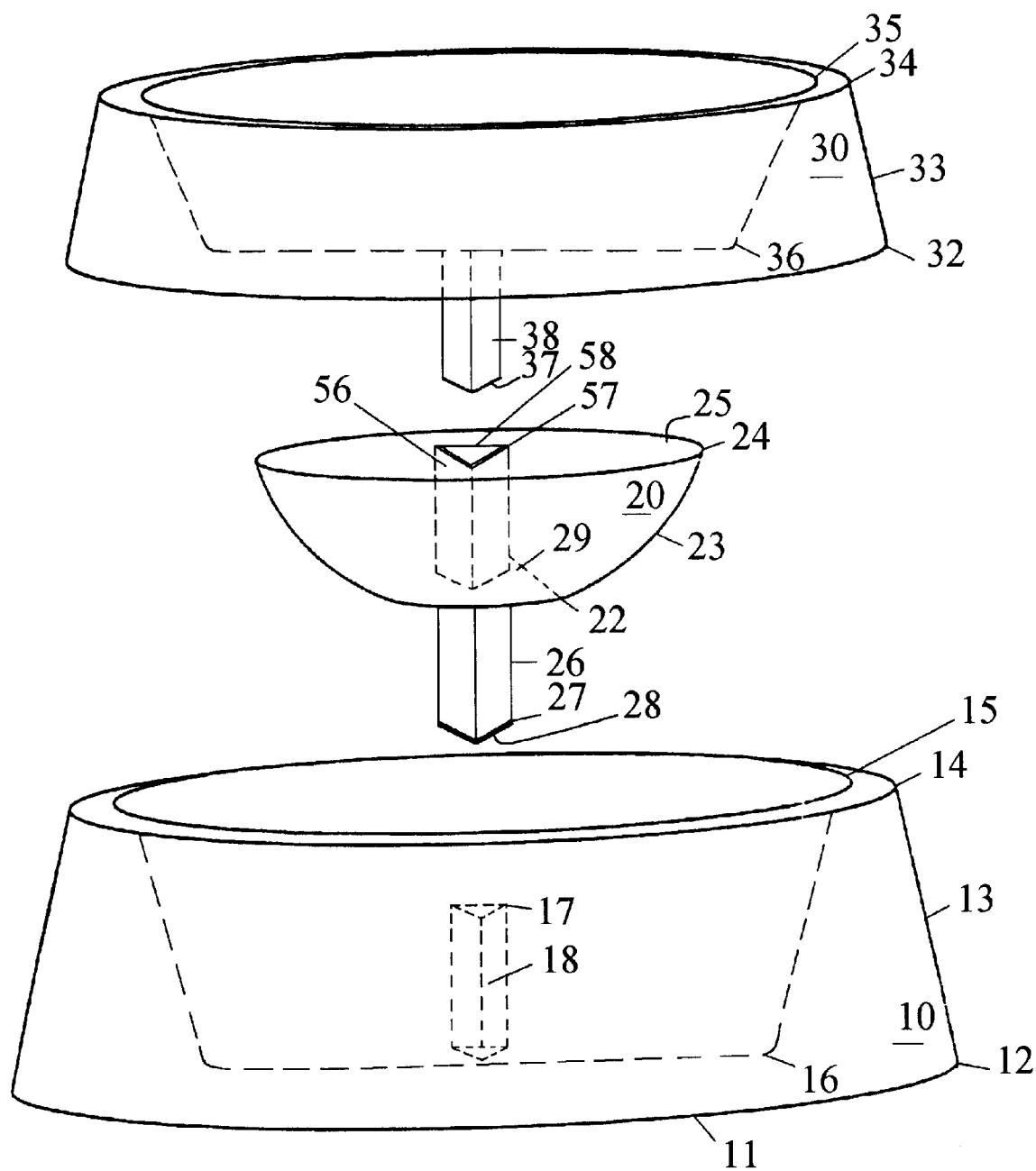
FIG. 1 is an exploded unassembled view of the three piece feeding bowl.

FIG. 1 is an exploded unassembled view 1 of the three piece feeding bowl having a bottom bowl 10, center bowl 20 and top bowl 30. Bottom bowl 10 includes a flat bottom 11 having an exterior diameter 12 being approximately 12 inches, inwardly sloping sides 13 and a flat top ring edge 14-15 having an exterior diameter of approximately 11 inches. The inside of bowl 10 has a depth of approximately 4 inches deep to bottom 16. Inner bottom diameter 16 can have a diameter of less than the diameter between flat top ring edge 14-15. A upwardly projecting solid stem 18 having a top end 17 rising from a center portion of interior bottom 16 has a triangular cross-sectional shape with a height of approximately 2 inches.

Center bowl 20 has a flat bottom 22 having a diameter less than the interior bottom diameter 16 of bottom bowl 10, rounded sides 23 expanding to a top exterior edge 24 having a diameter of approximately 6 inches, and an interior depth of approximately 2 inches deep. A downwardly projecting hollow stem 26 with tip edge 27 and a hollow interior 28 extends from a center bottom portion of exterior bottom 22 having a triangular cross-sectional shape having a height of approximately 2 inches. An upwardly projecting hollow stem 56 with a hollow interior 58 rises from a center portion of the interior bottom 29 has a triangular cross-sectional shape with a height of approximately 2 inches.

Top bowl 30 includes a flat bottom 32 having an exterior bottom diameter 32 being slightly less than approximately 11 inches, inwardly sloping sides 33 and a flat top ring edge 34-35 having an exterior diameter of approximately 10 inches. The inside of bowl 30 has a depth of approximately 2 inches deep to bottom 36. Inner bottom diameter 36 can have a diameter of less than the diameter between flat top ring edge 34-35. A downwardly projecting solid stem 38 extends from a center portion of exterior bottom 36 has a triangular cross-sectional shape with a height of approximately 2 and ½ inches.

Figure 2:
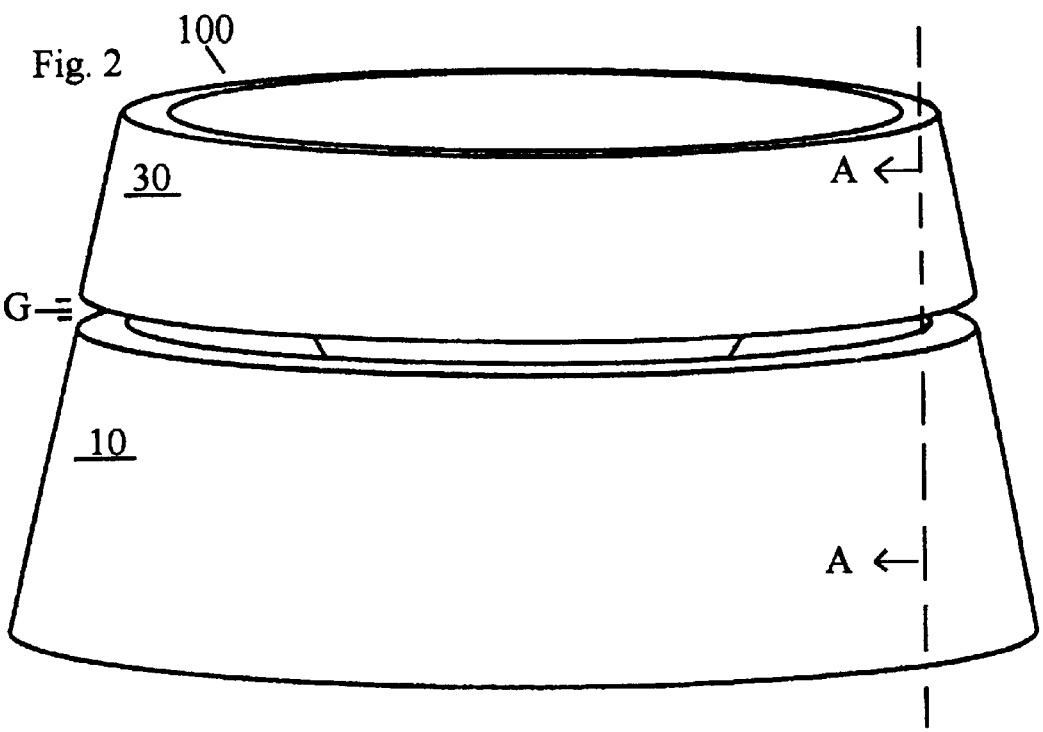
FIG. 2 is a side view of the three piece feeding bowl of FIG. 1 assembled together.
Figure 3:
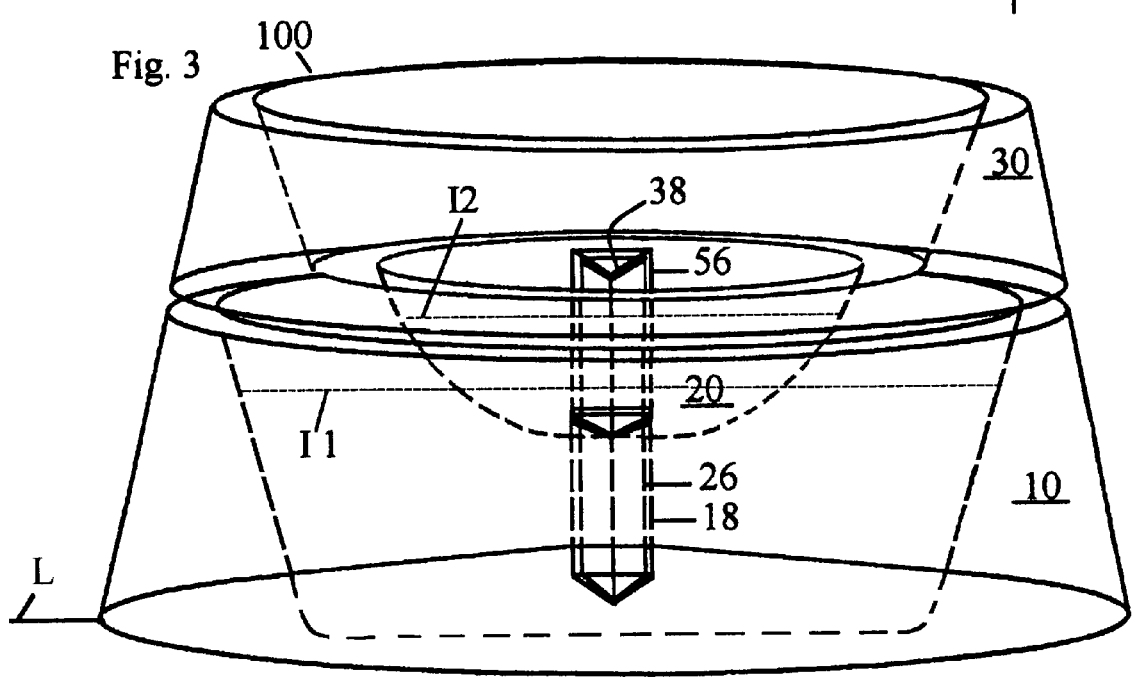
FIG. 3 is a side cross-sectional view of the three piece feeding bowl of FIG. 2 along arrow A.

FIG. 2 is a side view 100 of the three piece feeding bowl 1 of FIG. 1 assembled together. FIG. 3 is a side cross-sectional view of the three piece feeding bowl 100 of FIG. 2 along arrow A.

Referring to FIGS. 1, 2 and 3, the bottom 28 of downwardly projecting hollow stem 26 of center bowl 20 mateably interlocks over and about the top 17 of upwardly projecting stem 18 of bottom bowl 10. Similarly, the bottom tip 37 of solid stem 38 of top bowl 30 fits into the top edge 57 and hollow portion 58 of upwardly projecting stem 56 of center bowl 20. The assembled configuration has a small gap G, of approximately ½ an inch, with the center bowl 20 not directly visible from outside the bowls 100. When assembled the combination of bowls 10, 20, and 30 give the appearance of a single dish having a bottom with a larger diameter than the top. The overall height of the assembled invention can be approximately 6 and ½ inches high. The invention can also be used where the final assembly is approximately 5 and ½ inches to approximately 8 and ½ inches in height.

Insects crawling from outside ground level, L, would have to travel across two separate obstruction mediums I1 and I2 to reach top bowl 30. As shown mediums I1 and I2 can each be a non-toxic creature inhibiting liquid for inhibiting the insects(ants, fleas), worms, and the like. Household detergent such as a liquid drop of liquid household detergent, with water in both the bottom and middle bowls has been found to be an excellent toxic substances for fire ants while being safe if ingested by household pets such as dogs and cats. Additionally, both the bottom and center bowls 10 and 20 can include a liquid in one bowl and a dry material in the other. Still furthermore center and bottom bowls 10, 20 can both include dry insect preventing material in both bowls, such as but not be limited to dry flea powder and the like. Novel applications can include two different non-toxic mediums I1 and I2 in both bowls, such as but not limited to a flea inhibiting material in one bowl and a worm inhibiting material in the other bowl.

Each of the three pieces 10, 20, 30 can be formed from injection molded plastic and are only interlocked and connected by the hollow and solid triangular cross-sectional shaped stems. Although, the preferred embodiment describes using triangular cross-sectional shaped stems, other non-cylindrical shaped stems such as but not limited to square, rectangular, octagon, and the like can be used.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A three piece pet feeding dish apparatus, comprising:

a bottom bowl having a ground engaging bottom with a bottom exterior diameter, inwardly sloping sides, and a top portion having an opening for an interior cavity with a top exterior diameter less than the bottom exterior diameter, the bottom bowl having a first non-cylindrical shaped stem extending upward from a central portion of the interior cavity;

a center bowl having a bottom with a second non-cylindrical stem extending downward beneath the bottom, the center bowl having a top portion with an interior cavity, the center bowl having an exterior diameter less than the diameter of the interior cavity of the bottom bowl, the center bowl having a third non-cylindrical shaped stem extending upward from a center portion of the interior cavity; and a top bowl having a bottom with an exterior diameter approximately identical to the top exterior diameter of the bottom bowl, the bottom of the top bowl having a fourth non-cylindrical shaped stem extending downward from a central portion of the flat bottom, wherein the first non-cylindrical stem and the second non-cylindrical stem telescopingly and mateably interlock with one another, and the third non-cylindrical stem and the fourth non-cylindrical stem telescopingly and mateably interlock with one another, so that the bottom, center and top bowls are not able to rotate when assembled together, and the bottom bowl and the top bowl appear together as one single food dish with the center bowl hidden from view.

2. The three piece pet feeding dish of claim 1, wherein the first non-cylindrical stem, the second non-cylindrical stem, the third non-cylindrical stem and the fourth non-cylindrical stem each have a triangular cross-section.

3. The three piece pet feeding dish of claim 1, wherein the top bowl and the bottom bowl have an overall height assembled together of approximately seven inches.

4. The three piece pet feeding dish of claim 1, wherein the bottom bowl and the center bowl are both filled with a non-toxic creature inhibiting liquid.

5. The three piece pet feeding dish of claim 1, wherein the bottom bowl and the center bowl are both filled with a non-toxic undesirable creature inhibiting dry material.

6. The three piece pet feeding dish of claim 1, wherein the bottom bowl and the center bowl include a non-toxic creature inhibiting liquid in one bowl and a non-toxic creature inhibiting dry material in the other bowl.

7. The three piece pet feeding dish of claim 1, wherein the bottom bowl and the center bowl each include different creature inhibiting materials.

8. The three piece pet feeding dish of claim 1, wherein the bottom bowl has an exterior diameter of approximately 12 inches and the top bowl has an exterior diameter of approximately 10 inches, with a gap of approximately 0.5 inches there between.

9. The three piece pet feeding dish of claim 1, wherein at least one of the bottom bowl and the center bowl includes:
   a detergent toxic to creatures but non toxic to household pets.

10. The three piece pet feeding dish of claim 9, wherein the creatures include:
    fire ants.

11. A three piece pet feeding dish apparatus, comprising:
    a bottom bowl having a ground engaging bottom with a top exterior diameter less than a bottom exterior diameter, and an interior cavity having a first non-cylindrical shaped stem extending upward from a central portion of the interior cavity;
    a center bowl having a bottom with a second non-cylindrical stem extending downward beneath the bottom, the center bowl an interior cavity, the center bowl having a exterior diameter less than the diameter of the interior cavity of the bottom bowl, the center bowl having a third non-cylindrical shaped stem extending upward from a center portion of the interior cavity; and
    a top bowl having a bottom with an exterior diameter approximately identical to the top exterior diameter of the bottom bowl, the bottom of the top bowl having a fourth non-cylindrical shaped stem extending downward from a central portion of the flat bottom, wherein the first non-cylindrical stem and the second non-cylindrical stem telescopingly and mateably interlock with one another, and the third non-cylindrical stem and the fourth non-cylindrical stem telescopingly and mateably interlock with one another, so that the bottom bowl and the center bowl and the top bowl do not rotate relative to one another when assembled, and the bottom bowl and the top bowl appearing as one single food dish with the center bowl hidden from view.

* * * * *